3,157,197
SAFETY CONTROL SYSTEM FOR FLUID
DISTRIBUTION AND APPARATUS
Harold E. Handley, Jackson, Mich., assignor, by mesne assignments, to Textron, Inc., Providence, R.I., a corporation of Rhode Island
Application Nov. 29, 1961, Ser. No. 155,702, which is a division of application Ser. No. 751,559, July 28, 1958, now Patent No. 3,021,866, dated Feb. 20, 1962. Divided and this application Sept. 17, 1962, Ser. No. 224,135
1 Claim. (Cl. 137—458)

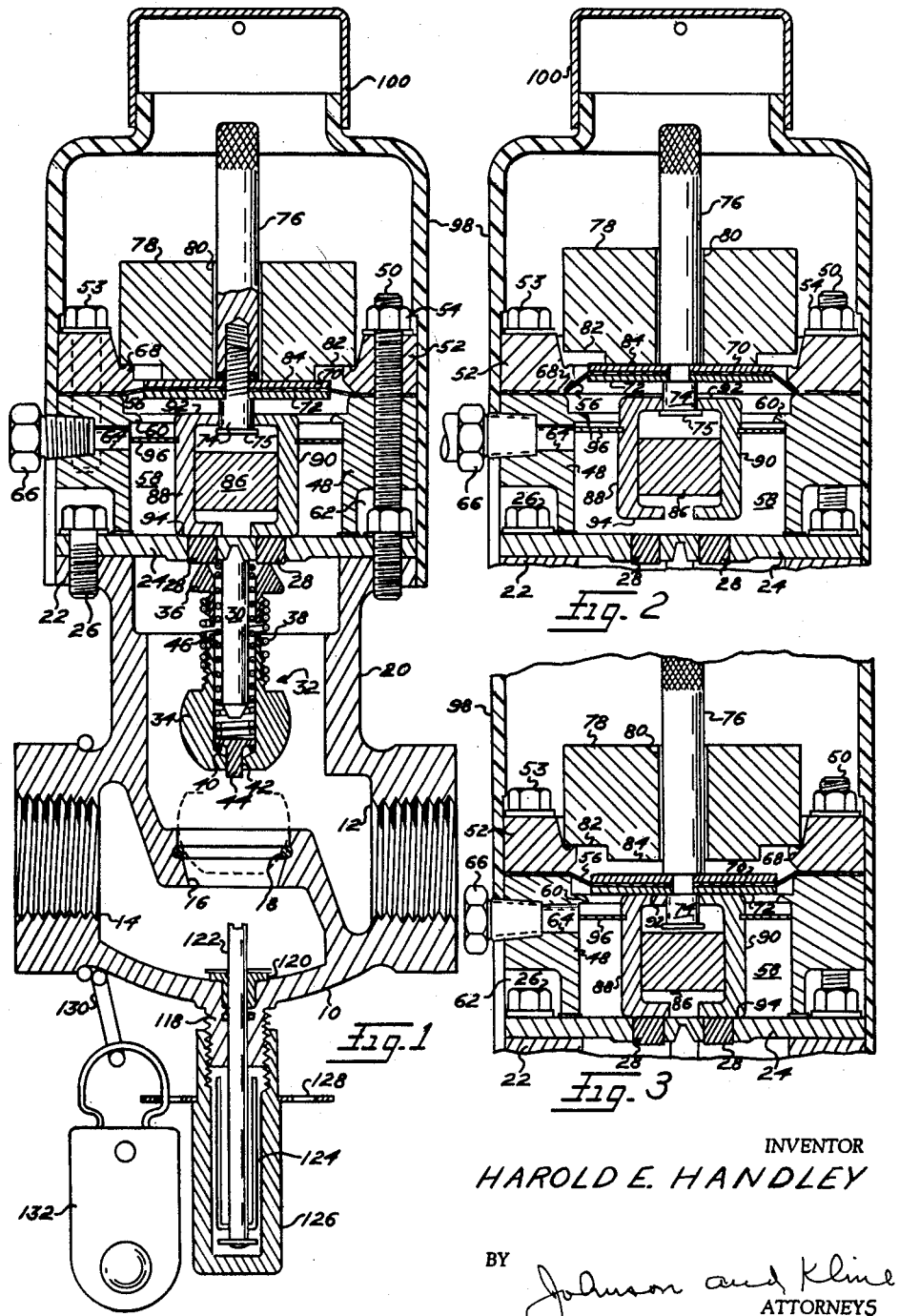

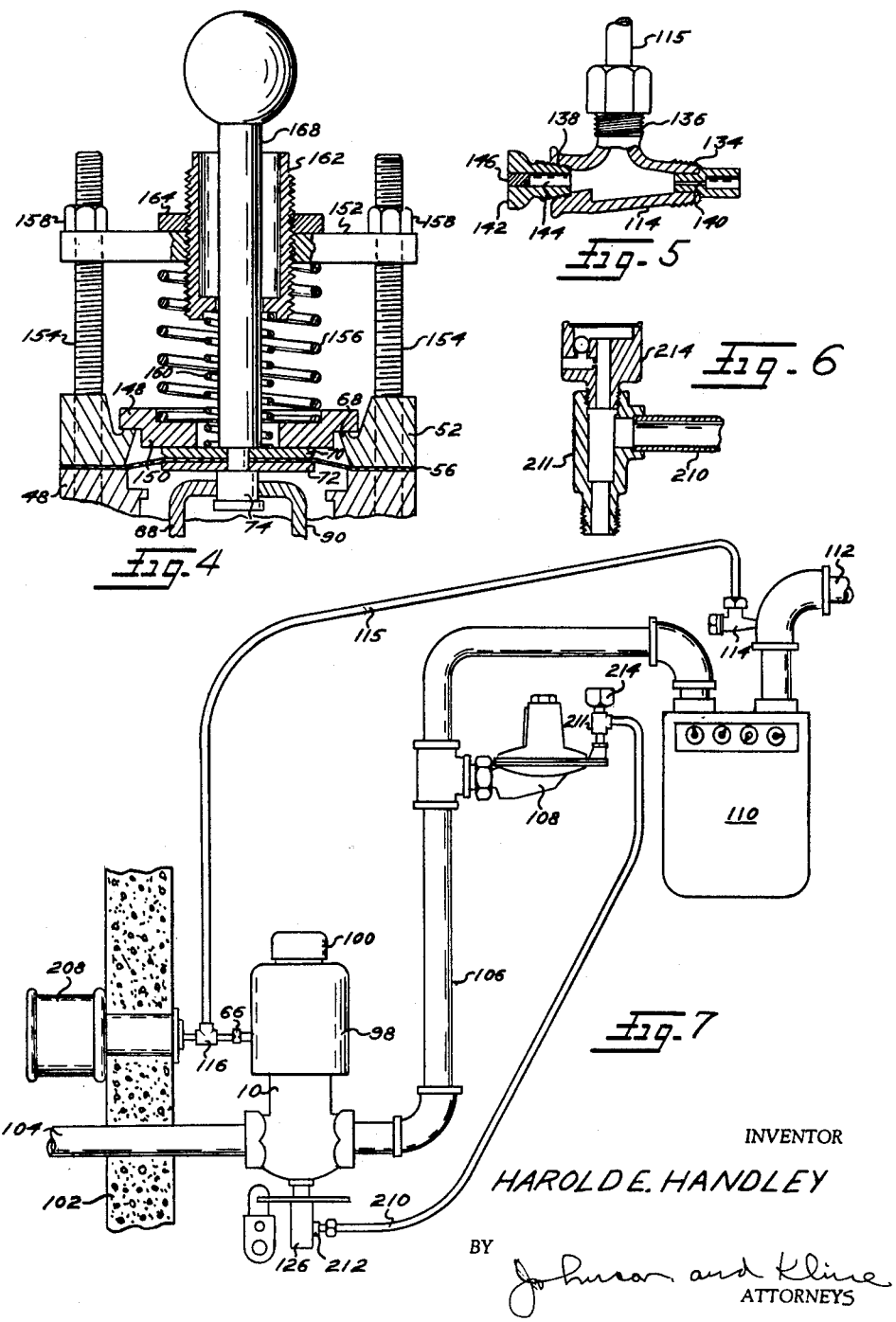

The invention relates to improvements in safety gas valve structures which will function under abnormal conditions to shut off gas flow within supply lines and is particularly adapted for use with feeder lines to residences and other consumers whereby the gas flow to the meter and internal distributing system may be stopped upon the event of abnormal conditions within or adjacent the gas line.

This application is a division of my application Serial No. 155,702, filed November 29, 1961 which in turn is a division of application Serial No. 751,559, filed July 28, 1958, now Patent No. 3,021,866, granted February 20, 1962.

In its preferred form the improved gas valve structure will function to close the gas line in the event of excessive line pressure, inadequate line pressure, abnormally high ambient temperatures, flooding and may also be manually operated to stop the gas flow. In general the abnormal conditions are most likely to result from malfunctioning of the gas distribution system and to prevent explosion and unsafe conditions a valve responsive to the above irregularities adds greatly to the safe use of gas.

To describe a typical installation in a home or commercial building, the improved valve is preferably located in the gas feeder line between the gas entrance to the building or dwelling and the gas meter, or if the meter is located in a meter box on the outside of the building the valve is located in the gas line before the regulator and the meter.

The release and control mechanism for the shut off valve elements comprise a variable volume control chamber including a preloaded diaphragm operatively connected to a valve actuating support member. The chamber being under influence of the pressure within the gas line whereby movement of the diaphragm under gas pressure will operate the valving means. It is thus an object of the invention to provide an improved safety gas valve structure capable of functioning to shut off the gas supply to gas consuming devices under abnormal line pressure conditions capable of insuring the safe and normal supply of gas to the consuming device.

Another object of the invention is to provide a safety gas shut off valve having valve structure responsive to abnormal exterior conditions whereby the gas flow to gas consuming devices is interrupted upon the ambient temperature about the valve structure becoming unusually high, as in the case of fire, likewise gas flow is automatically shut off upon the valve structure becoming submerged in water should flood conditions occur.

Still another object of the invention is to provide a safety gas shut off valve wherein the gas flow will automatically cease upon abnormal line pressure conditions and the gas flow may not be resumed until authorized personnel has checked the gas consuming devices and properly inspected the distributing system.

Another object of the invention is to provide a safety gas shut off valve structure which may be manually operated by the consumer but may be actuated to resume gas flow by authorized personnel wherein seal means prevent tampering and unauthorized restoration of gas service.

Another object of the invention is to provide an automatic gas shut off valve for use within a gas line employing a pressure regulating device wherein maximum venting of the regulator is provided upon the opening of the valve.

These and other objects of the invention residing in the constructional combination and arrangement of parts will more fully appear from the following description and the appended claim.

In the drawings,

FIGURE 1 is a cross sectional elevational view of the valve of the invention in the normal operating position.

FIGURE 2 is a sectional view of the pressure chamber and enclosed components under excessive pressure conditions.

FIG. 3 is a sectional view similar to FIG. 2 illustrating the pressure chamber under abnormally low pressure conditions.

FIG. 4 is a sectional elevational view of spring loaded diaphragm means which may be employed with the invention.

FIG. 5 is a sectional view of the thermal plug T used with the control valve.

FIG. 5 is a sectional view of the thermal plug T used pass T.

FIG. 7 is a layout of a typical installation employing the control valve and the preferred safety interlocks.

Referring to FIG. 1 wherein a control valve employing the concepts of the invention is illustrated in the normal open position it is observed that the valve includes a valve casing 10 having a threaded inlet port 12 and a similar outlet port 14 separated by an integral web in which the valve seat 16 is formed. Seat 16 is of a conical configuration and annularly grooved to receive the sealing ring 18. The casing 10 is formed with a cylindrical neck 20, the upper surface of which is flanged at 22 and provided with a series of tapped holes.

The neck 20 is enclosed by a disc like non-magnetic partition 24 which is affixed to the flange 22 by three circumferentially spaced bolts 26 threaded into aligning tapped holes within the flange and to insure a fluid tight seal between the flange and partition a gasket is preferably interposed therebetween. For purposes later described, the partition 24 which is of brass, aluminum or other material of non-magnetic properties and is provided with at least a pair of spaced magnetic flux conducting contact buttons 28 which are located within the partition near the center thereof. In the preferred embodiment four contact buttons 28 are used, two of which are shown, two buttons being used for each magnet pole. It is important that the contact buttons 28 be firmly secured within partion 24 to prevent leakage of the fluid within the valve casing and may be soldered or similarly affixed to the partition. The buttons 28 extend completely through the partition 24 and are machined on each side such that a planar contact surface is presented at both sides of the partition. A spring guide pin 30, also of non-magnetic material, is coaxially affixed to the partition 24 intermediate the buttons 28 and depends into the neck 20 of the casing to act as a guide for the valve element and actuating spring thereof.

The valve element 32 consists of a lower valve stem body 34, the sides of which are spherical, and an upper valve stem top 36 affixed thereto to body 34 in axial spaced relation by a spring 38. The stem top 36 is of a magnetic material such as steel and is provided with an annular planar surface at the upper end for intimate contact with the buttons 28. The valve stem body and top are formed with an axial bore which terminates in the valve body 34 forming a shoulder 40 at the junction with a reduced bore 42 which extends through the valve body to the lower surface thereof. A poppet valve 44 having enlarged head and a downward extending stem rests on an O ring seal abutting shoulder 40 such that the poppet valve stem projects through bore 42 and below the valve body 34. A stem spring 46 is inserted in the bore of the valve stem top 36 and body 34 resting on the head of poppet valve 44 at the lower end, and as assembled over the guide pin 30, abuts the partition 24. The spring 46 is of sufficient length to be under slight compression when the valve element is released from partition 24, e.g. when the valve body 34 engages the sealing ring 18 of the valve seal as will be explained.

A pressure chamber is formed adjacent partition 24 and is defined on the sides by a cylindrical chamber wall member 48 which is concentrically affixed to partition 24 and flange 22 by means of threaded studs 50 extending through holes in the wall member and engaging tapped holes within flange 22. An annular support ring 52 is superimposed on wall 48 and has stud holes formed therein whereby tightening of nuts 54 will securely maintain the chamber wall and support ring in position. A set of three additional bolts 53 may be used to secure the support ring to the chamber wall member 48 to aid in assembly. Preferably a gasket is interposed between the lower edge of wall member 48 and partition 24 and a diaphragm membrane 56 is located between support ring 52 and wall 48 defining the upper enclosure of the pressure chamber 58. The diaphragm 56 is preferably formed of a Buna rubber nylon reinforced material which resists decomposure due to gas or air contact, is highly flexible yet resists extensive stretching and is provided with an axial hole through which the diaphragm controlled structure is affixed as later described.

The chamber wall member 48 is formed with an internal annular lip 60 and an external undercut 62 which provides clearance for the heads of bolts 26. A threaded port 64 opening into chamber 58 provides access to the interior of the pressure chamber and a conduit may be affixed to the nylon fitting 66 for communication therewith. The support ring 52 is formed with an internal annular weight support ledge 68 which is located in vertical spaced relation to the diaphragm 56.

The diaphragm controlled structure includes an upper diaphragm washer 70 and a magnetic shunt or shorting washer 72 in contiguous relation to the diaphragm on opposite sides thereof. Both of these washers are provided with a small axial bore through which the threaded stem of an non-magnetic stud 74 projects. The stud 74 is of cylindrical configuration and is machined with a flanged head 75. Preferably stud 74 is of brass; however, aluminum or possibly a non-metallic material may be used. The stud 74 threads into an axial threaded bore in the lower end of a manual trip rod 76 which is machined with a knurled upper end. Thus by firmly threading stud 74 into rod 76, the washer 70 and 72 will firmly compress the diaphragm 56 therebetween sealing the hole through the diaphragm and establishing the washer, trip rod and stud as a unit.

The diaphragm may be loaded against vertical upward movement by means of a dead weight taking the form of the illustrated weight 78. The weight is of cylindrical cross section having an axial bore 80, providing clearance for the trip rod 76, and a reduced diameter forming an annular shoulder 82 and a lower diaphragm washer contact surface 84. The weight 78 rests freely upon the ledge 68 and under normal operating conditions the pressure within chamber 58 maintains the washer 70 against the contact surface 84.

A magnet assembly is located wholly within the pressure chamber 58 whose puropse is to actuate the valve element 32 in accordance with the conditions prevailing within the chamber. The type of magnet employed with the described embodiment is of the bar type, as at 86, to which are affixed U shaped magnetic pole pieces 88 and 90. The pole pieces 88 and 90 are of similar size and shape and together form an upper magnet surface 92 and a lower magnet surface 94, each being broken by an air gap. The upper magnet surface 92 is formed with arcuate recesses opening into the air gap to provide a sliding clearance for the stud 74 which extends through the central portion of the upper air gap; however, the construction is such that relative upward sliding of the stud to the upper pole piece elements is limited by the flange 75 which will contact the underside of the upper horizontal pole piece elements. A non-magnetic stripper plate 96 having a diameter less than of the internal diameter of chamber 58 encompasses the pole pieces 88 and 90 and is affixed thereto. The stripper plate 96 is formed with an integral radial key on the periphery thereof, not shown, coacting with a groove within the internal surface of wall member 48 and parallel with the axis thereof, whereby vertical movement of the magnet assembly within the chamber 58 is permitted; yet relative rotation is prevented.

In the normal control valve operating condition the magnet assmbly will be in the position of FIG. 1 wherein the lower magnetic surface 94 formed by the pole pieces rests upon the partition 24, each pole piece engaging a contact button 28, or a pair of contact buttons where a total of four buttons are employed. When the magnetic valve stem top 36 engages the lower side of partition 24 a flow path for the magnetic flux from the "North" pole piece of the magnet assembly to the "South" pole piece is established through the buttons 28 and valve stem top which is sufficient to maintain engagement of the stem top with the partition 24 holding the valve body 34 from the valve seat 16 and permitting flow through the valve casing. By employing a relatively limited contact area between the stem top and contact button, e.g. an annular rim, the magnetic flux is concentrated and maximum efficiency obtained.

To present a clean and attractive appearance to the control valve a hood 98 may be used to encompass the components above the flange 22, an opening being provided in the hood for the fitting 66, and a removable cap 100 affixed to a hatch in hood 98 to provide access to the trip rod 76.

Referring to FIG. 7 an example of a gas control system is illustrated utilizing the control valve of the invention. Assuming the components of the system to be within the confines of the building or dwelling using the gas the building wall is represented at 102 and the fluid supply line at 104 which is connected to the inlet portion of the valve casing 10 of the automatic control valve. A conduit 106 pipes the fluid from the control valve outlet to a conventional pressure regulator 108 and the regulated fluid is passed into a meter 110 and hence into the appliance supply system through line 112. A fitting 114 communicates with the line 112 and is connected by tubing 115 with a three way fitting T 116 threaded to the nylon fitting 66 opening into the pressure chamber 58; thus the chamber 58 will be under the same pressure as the appliance supply line 112 and fluctuations of the pressure within line 112 will also occur within the chamber.

As stated above, FIG. 1 represents the control valve under normal pressure conditions, e.g. the fluid pressure within chamber 58 acting on the diaphragm 56 will hold the washer 70 in contact with the contact surface 84 of the weight 78 and the magnetic flux flowing through buttons 28 and stem top 36 maintains the valve seat open for the flow of fluid through the valve casing 10.

The mass of weight 78 is predetermined to regulate the point at which the valve will close under excessive pressure conditions and this action occurs as follows: When the pressure within line 112 becomes excessive, for instance should the pressure regulator malfunction, the resulting force on the underside of diaphragm 56 will lift the weight 78 from the ledge 68 with attendant movement of the washers 70, 72, trip rod 76 and stud 74. As the stud 74 is lifted, the flange 75 thereof engages the underside of the upper horizontal pole piece elements and subsequent movement will lift the entire magnet assembly. It will be noted that as the length of stud 74 is greater than the thickness of the pole pieces the connection between stud and magnet assembly is of the lost motion type and the magnet assembly will not raise unless the pressure within the chamber becomes sufficient to support the weight and lift the weight from the ledge 68. A lifting of the magnet assembly of approximately $1/16$ of an inch from the contact buttons 28 is sufficient to weaken the flux flowing therethrough to cause the weight of the valve element and the action of stem spring 46 to drop the valve element wherein the body 34 engages the valve seat 16 stopping the flow of gas. This condition is shown in FIG. 2. It will be observed that the pressure of the gas within the inlet port also serves to maintain seating of the valve body.

Should the pressure within line 112 fall below a desired minimum pressure as would occur upon a major leak or break in the appliance supply lines, the control valve also functions to stop the gas flow. Referring to FIG. 1, normally the gas pressure within chamber 58 maintains the diaphragm and washers 70 and 72 in a spaced relation to the upper surface 92 of the magnet assembly sufficient to prevent interference by the shunt washer 72 with the magnetic field of the assembly; however, upon a decrease of gas pressure within chamber 58 to the point where the pressure force acting on the underside of the diaphragm is insufficient to support the weight of the washers 70 and 72, stud 74, trip rod 76 and the diaphragm, the diaphragm will move downwardly. Continued downward movement of the diaphragm will lower the shunt washer 72 onto the surface 92 thereby providing a flux path of least resistance between the pole pieces which substantially decreases the flux within the contact buttons 28 and releases the valve element for sealing of the valve seat 16 and complete shut off of the gas flow, see FIG. 3.

After the source of malfunction which caused the control valve to close has been remedied the control valve must be reset and means for accomplishing resetting are provided within the valve casing. Referring to FIG. 1, the reset means includes a threaded projection 118 formed on the valve casing coaxial with the axis of the valve seat 16 and valve element 32. A bore is provided in projection 118 within which the bushing 120 is fitted. A reset rod 122 is supported within the bore and bushing 120 for axial slidable movement and is provided at the lower end with a safety lock pin 124 of U shape, the legs of which may be pivoted either parallel with rod 122 or at an angle thereto. A cap 126 may be threadedly affixed to the projection and an annular perforated seal plate 128 is permanently attached to the cap. A seal ring 130 is attached to the valve casing 10 and a seal 132 interconnects the seal ring and plate to prevent unauthorized removal of the cap 126.

When the cap 126 is threaded on the projection 118 the legs of the safety lock pin 124 must be extending approximately parallel to rod 122 and this relationship is possible only when the rod is in the retracted position of FIG. 1 as otherwise the pin legs would overlap the sides of the projection 118 and prevent the cap from being threaded thereon. Thus the cap 126 may not be affixed to the projection unless the reset rod is retracted preventing accidental mispositioning of the reset rod as will be later apparent.

Resetting the valve is accomplished by removing the seal 132 and the cap 126, the cap 100 should also be removed at this time. The legs of pin 124 are pivoted to a position approximately at right angles to rod 122 which permits the rod to be axially moved toward the valve seat 16 whereupon the rod will engage the stem of the poppet valve 44 unseating the valve 44 permitting gas to be bled into the outlet chamber of the valve casing. During this phase of resetting the gas appliances must be shut off whereby the pressure on the outlet and inlet sides of the valve body 34 will gradually equalize. After the pressure on the outlet side of valve body 34 is sufficiently built up to permit manual unseating of the valve body from valve seat 16, continued upward movement of reset rod 122 will engage the rod with the lower side of the valve body lifting the entire valve assembly until the valve stem top 36 contacts the partition 24 and buttons 28.

After the gas pressure within the appliance line 112 has been shut off by actuation of the control valve the pressure in chamber 58 will usually decrease to a point where the shunt washer is resting on the upper surface 92 of the magnet assembly, even if high pressure within line 112 caused initial actuation of the valve element, due to pilot lights etc. Therefore, before the magnetic flux through buttons 28 and stem top 36 will be sufficient to hold the valve element 32 in open position the shunt washer 72 must be removed from the surface 92. To accomplish this, the upper manual trip rod 76 is grasped by the operator and lifted vertically initially raising the diaphragm, washers 70 and 72 and the magnet assembly; however, once the stripper plate 96 engages the underside of the lip 60 the magnet assembly is prevented from further upward movement and the shunt washer 72 is pulled from the surface 92 whereupon the magnet assembly will fall into engagement with the partition 24 and surface 92 will rest upon contact buttons 28 establishing a flux path through the buttons and stem top 36 and maintain the valve element in the open position.

The reset rod 122 is then retracted, the legs of safety lock pin 124 folded back adjacent to the rod 122 and substantially parallel thereto, cap 126 replaced and a new seal affixed. The control valve will now permit the gas to flow into the appliance line until the next actuation. The use of safety lock pin 124 insures that the cap 126 cannot be replaced until the reset rod 122 is retracted to a position which will not interfere with seating of valve body 34 in the seat 16. Thus it is unlikely that the operator will forget to retract rod 122 after restoring the valve element to the open position.

The fitting 114 performs the functions of a dampener and a thermal release valve as well as a means for affixing the tubing 115 to the line 112. Referring to FIG. 5 the fitting 114 is provided with intersecting passageways accessible by threaded connection ports 134, 136 and 138. The port 134 is adapted to be attached to the line 112 for communication therewith and is provided with a restricted orifice 140, for example of the diameter of a number 80 drill (.0135″). The tubing 115 is affixed to the port 136 and a thermal plug 142 having an axial bore 144 greater than orifice 140 seals the port 138. A low melting point alloy 146 plugs the bore of the thermal plug which will melt at approximately 150° F. The fitting 114 is preferably affixed at a point to line 112 close to the ceiling of the area containing the control valve, regulator and meter such that a fire occurring in this area would heat the thermal plug, melt the alloy and open the passageways of the fitting 114 to the atmosphere. As the bore 144 of the thermal plug is larger than orifice 140 the pressure within tubing 115 and valve pressure chamber 58 will quickly drop releasing the valve element 32 and stopping the gas flow.

The primary purpose of orifice 140 is to dampen the effect of pressure fluctuations within line 112, whereby short increases or decreases in the fluid pressure as would be caused by the opening or closing of the valves of major appliances will not cause the valve element 32 to be released.

The control valve of the invention will also close under flooding conditions wherein the control valve is submerged. Under normal gas pressures for domestic use the pressure within chamber 58 is equal to that of approximately 7 inches of water and thus should the depth of flood water above the diaphragm 56 be greater than 7 inches the pressure exerted on the diaphragm by the water will push the diaphragm down contacting shunt washer 72 with magnet assembly surface 92 and releasing the valve element as though under minimum pressure valve element actuating conditions.

Release of the valve element 32 may also be achieved by removing cap 100 and lifting trip rod 76 simulating maximum release pressure conditions and thus the control valve functions also as a manual shut off valve which may be operated by the gas consumer. It will be understood that although tripped by the consumer the valve cannot be restored to the "on" position except by breaking the seal etc. and thus it will be necessary to notify the gas company when it is desired to restore service reducing the chances of leaking gas due to the unlit pilot lights, etc.

Should it be desired to employ the control valve with a fluid system of higher than normal pressures, the loading of the diaphragm with a weight becomes impractical because of the mass involved and thus a spring loading arrangement may be used as illustrated in FIG. 4. The structure employed with the spring loaded diaphragm is similar to that employed with the above described embodiment from the support ring 52 to the reset means; however, the upper diaphragm washer 70 is engaged by a disc 148 rather than a dead weight. The disc 148 is provided with a central hole and is supported on the ledge 68 and is provided with an undercut portion 150 to extend below the ledge. An adjustment plate 152 is positioned in spaced relation to support ring 52 by three studs 154 which replace studs 50 but are of greater length. A high pressure spring 156 is interposed between disc 148 and plate 152 and the compression of spring 156 may be regulated by positioning plate 152 by adjusting the self locking nuts 158 on the studs 154.

It is usually desirable to increase the minimum shut off pressure when increasing the maximum shut off pressure and thus a low pressure spring 160 is used to augment the downward movement or collapse of the diaphragm upon the pressure within chamber 58 decreasing below the desired minimum value. The compression of spring 160 is adjusted by an exteriorally threaded tubular sleeve 162 threaded into plate 152 and fixed in position by lock nut 164. The lower end of spring 160 extends through the central opening in disc 148 and rests upon the upper diaphragm washer 70. It will be understood that the spring 160 is of light weight and pressure characteristics and the pressure exerted on the diaphragm washer thereby is very accurately adjusted. As with the dead weight type valve, a manually operable trip rod 168 is affixed to the diaphragm and extends through springs 156 and 160 and sleeve 162 and is provided with a ball knob and a housing and cap may be used to encompass the structure as with the aforedescribed embodiment. It will be thus understood that by the use of springs the valves of the maximum and minimum pressures to actuate the valve element may be easily adjusted and that a wide range of actuating pressures may be obtained.

Referring again to FIG. 7 several safety and convenience features may be incorporated with the improved control valve resulting in a safe gas system which may be easily adapted to meet local installation codes. For instance, if an external gas shut off is required by the code, the use of a curb box valve may be eliminated by employing a manually operable bleeding valve located within a housing 208 on the exterior side of wall 102 connected to the fitting 116 by tubing. The valve within housing 208 may be of conventional type, the only requirement being that the valve when open has a larger opening than orifice 140 whereby the pressure within chamber 58 will drop below the minimum pressure value and release the valve element.

A further feature which increases the safety and life of the gas system includes a conduit 210 of tubing which is affixed to the regulator 108 by a T 211 in communication with the "breathing" side of the regulator diaphragm and the other end of conduit 210 is affixed to a blind fitting 212 affixed to the cap 126 of the resetting structure which, in effect, seals this end of the conduit. When the control valve is being reset it is necessary to first remove the tubing at fitting 212 before the cap 126 may be removed and thus the "breathing" side of the regulator diaphragm will be unrestrictedly open to the atmosphere when the control valve is opened and any sudden pressures exerted on the regulator diaphragm effect immediate response by the regulator to achieve the proper gas pressure. The conduit 210 is preferably used in conjunction with an automatic check valve orifice vent limiter 214 of conventional construction which restricts the exhausting of air from the regulator yet permits air to easily enter the regulator diaphragm chamber. Vent limiters of this type are advantageous in that the regulator need not be vented to the outdoors as a leak in the regulator diaphragm only permits a small amount of gas to escape which is detectable yet not of sufficient quantity to be dangerous. However, when regulators employing vent limiters are subjected to sudden high pressures, as when the control valve is opened, regulator response is slow and undesirable high pressures may be briefly imposed on the appliance line. The conduit 210, in effect, by-passes the vent 214 during opening of the control valve and upon replacing cap 126 and reaffixing the end of conduit 210 to fitting 212 after restoration of the gas service will reestablish functioning of the vent limiter 214. Thus a simple, but effective, regulator breathing interlock is provided between the control valve and the regulator which permits the regulator to rapidly respond to pressure changes during opening of the gas line yet permits the limiter vent to function during normal operation.

It will thus be understood that the control valve of the invention provides an automatically responsive valve sensitive to excessive and inadequate line pressures, fire or dangerously high ambient temperatures and flooding. Manual control is also possible and constructional details such as making the valve element 32 of two pieces separated by a spring 38 to reduce the possibility of excessive vibration accidentally disengaging the valve element and tapering valve seat 16 such that destruction of sealing ring 18 by heat would not prevent sealing of the valve element combine to provide a superior control valve. By sensing the pressure within the appliance supply line malfunctioning of the regulator, meter or appliance may readily be detected by the valve with attendant valve actuation if necessary and the safe use of gas or other fluids advanced. The use of bolts 26 and studs 50 permit that part of the valve above the partition 24 to be replaced without leakage or loss of fluid from the casing as the partition will remain in position facilitating ease of repair and replacement.

It will be understood that various modifications to the described embodiments may be apparent to those skilled in the art and it is intended that the invention be defined only by the scope of the following claim.

I claim:

An automatic fluid flow control valve connected in a fluid line having inlet and outlet ports in communication through a valve seat and a valve element therefor normally held in open position, an automatic restrictedly vented pressure regulator downstream of said control valve, means releasing said valve element to engage said seat upon predetermined variations in the pressure of the fluid controlled, a valve element reset means associated with said valve element and operable upon manual actuation to restore the valve element to the normal open position, removable closure means enclosing said valve element reset means, by-pass regulator vent means by-passing the regulator restricting vent, and an interlock interposed between said closure and by-pass vent and effective in cooperation with said closure to close said by-pass when operative and opening said by-pass vent when rendered inoperative upon removal of said closure.

References Cited in the file of this patent

UNITED STATES PATENTS

| | | |
|---|---|---|
| 2,871,879 | Downe et al. | Feb. 3, 1959 |
| 2,937,658 | Stewart | May 24, 1960 |

UNITED STATES PATENT OFFICE
CERTIFICATE OF CORRECTION

Patent No. 3,157,197

November 17, 1964

Harold E. Handley

It is hereby certified that error appears in the above numbered patent requiring correction and that the said Letters Patent should read as corrected below.

Column 2, line 32 and 33, strike out "FIG. 5 is a sectional view of the thermal plug T used pass T." and insert instead -- FIG. 6 is a sectional view of the vent limiter and by-pass tee. --; column 4, line 10, for "puropse" read -- purpose --; line 26, before "of" insert -- that --; line 36, for "assmbly" read -- assembly --.

Signed and sealed this 6th day of April 1965.

(SEAL)
Attest:

ERNEST W. SWIDER
Attesting Officer

EDWARD J. BRENNER
Commissioner of Patents